June 27, 1944.    H. E. SEELY    2,352,570
OPTICAL BEAM DIRECTING DEVICE
Filed Oct. 10, 1941

INVENTOR:
HAROLD EMERY SEELY
BY Alex. E. MacRae
ATTORNEY.

Patented June 27, 1944

2,352,570

UNITED STATES PATENT OFFICE 2,352,570

OPTICAL BEAM DIRECTING DEVICE

Harold Emery Seely, Ottawa, Ontario, Canada

Application October 10, 1941, Serial No. 414,413

6 Claims. (Cl. 88—29)

This invention relates to optical beam directing means for optical or photogrammetric instruments such as, for instance, periscopes, projectors, range finders, camera lucidas, stereoscopes and map making devices.

It is common to employ, in such instruments, as the primary vision directing means, one or a pair of telescopes or equivalent lens-carrying structures. Such structures have the objection that they are relatively expensive in cost, largely due to the necessity of providing therein some means of restoring the image viewed therethrough to its natural position. A telescope consists primarily of an eye-piece or ocular and an object glass or objective. However, as is well known, if only an eye-piece and objective were included in such instruments, the image viewed therethrough would be inverted and laterally reversed. In the terrestrial telescope, two additional lenses are placed between the eye-piece and objective in order to restore the image to natural position. In prism binoculars, two prisms are placed between the eye-piece and objective, one prism serving to interchange the two sides of the image, and the other serving to restore it to upright position.

Apart from their costliness, a further difficulty arises with respect to the use of terrestrial telescopes and prism binoculars. For optical purposes in general, and particularly in map making and stereoscopic work, it is generally desirable to provide as great an area of vision as possible. It follows that low power magnification in the vision directing means employed is more or less essential since high power magnification and wide field of view are incompatible. In securing scale changes by using binoculars one side of which has a magnification differing materially from that of the other, the necessity of providing means of very low power magnification, in some cases of less than unity, is apparent. Moreover, the necessity of establishing a second focal plane in which a reticule may be viewed in sharp focus and the desirability of securing, in some instances, a compromise between a degree of magnification and width of field render it necessary to employ telescopes although they may be only of unity or low power magnification. Thus, magnification of less than unity, unity, and one or two power is a function frequently sought in such instruments. However, as magnification is lowered, the focal length of the objective lens becomes shortened and, since the image-restoring lenses or prisms must be arranged within such focal length, it becomes mechanically impracticable or impossible to construct a suitable instrument of sufficiently low magnification.

In some instruments, such as the periscope and mirror stereoscope, it is furthermore necessary to incorporate therein specific means for offsetting the line of sight.

It is an object of the present invention to provide an optical beam directing means of simple structure and free from the objections heretofore mentioned. It is a further object of the invention to provide an optical beam directing device of the type referred to which incorporates means for offsetting the lines of sight. To this end, the invention contemplates, in a broad aspect, the provision, in an optical instrument, of a system of mirrors constituting an optical beam reflecting means adapted to position an image viewed thereby in a natural position and also adapted to offset, at the same time, the optical beam. One form of the invention comprises the provision of a telescope, including only an eye-piece and an objective, and means, external of the telescope, for offsetting and restoring to its natural position an image viewed thereby.

Other objects, details and advantages of the invention will be apparent from the following description, with particular reference to the accompanying drawing, in which, Figure 1 is diagrammatic elevation of a mapmaking instrument embodying the invention.

Figure 1:
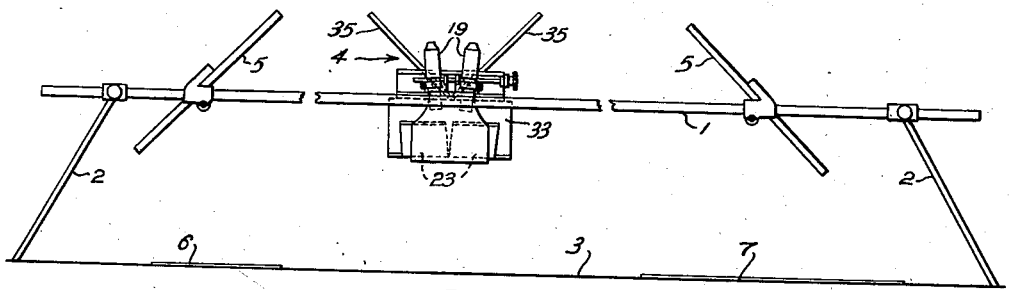
Figure 2:
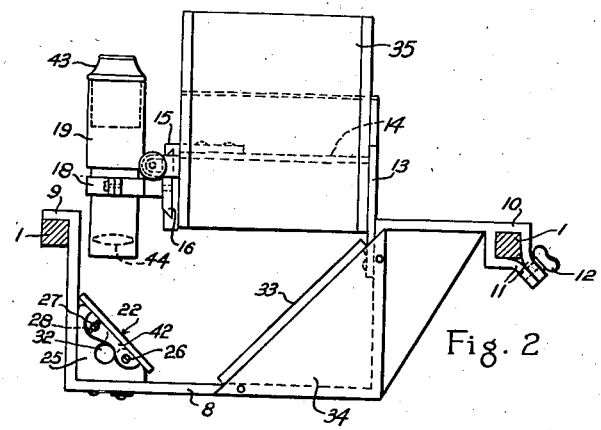
Figure 2 is side elevation of the optical beam directing means.
Figures 3, 4:
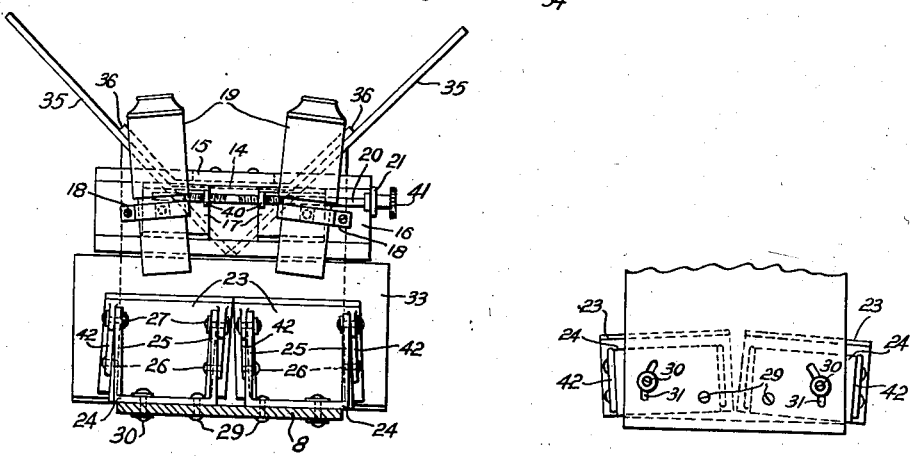
Figure 3 is a front elevation of the said means.
Figure 4 is a bottom detail view.

Referring to Figure 1 of the drawing, the mapmaking instrument comprises a pair of horizontally extending parallel bars 1 mounted on legs 2 above a drawing surface 3. An optical beam directing device as indicated at 4, is carried by the bars 1 and has sliding adjustable movement with respect thereto. Also adjustably mounted on the bars 1 are a pair of inclined mirrors 5, one on either side of the optical beam directing device. The mirrors 5 are arranged at a suitable degree of inclination, usually 45°, one mirror being adapted to deflect an optical beam rising from a photograph, map, scene or the like 6 on the drawing surface, and the other being adapted to deflect the other optical beam rising from a map 7 under construction.

The optical beam directing device 4 includes a substantially U-shaped frame member 8, having lateral flanges 9 and 10 each bearing on a bar 1. The flange 10 is provided with gripping jaws 11 engaging the bar 1 and adapted by means of the screw 12 to secure the frame in any adjusted position to which it may be moved on the bars. Integrally or otherwise fixed to the U-frame 8 is a second upwardly extending frame member 13 having a forward portion 14 extending in right angular relation thereto and in overhanging relation to the U-frame. Secured to the edge of the forward portion is a binocular-supporting frame 15, having a horizontally extending trackway 16 thereon. Slidably carried by the trackway are a pair of plates 17, each having a bracket 18 pivotally mounted thereon. Each bracket 18 carries one eye tube or half of the binocular 19. No image restoring or correcting means is included in the eye tubes, each of which contains only an eye-piece 43 and an objective 44. The eye-piece and objective may be mounted for adjustable movement with respect to each other for focussing purposes, as in ordinary telescopes. Means for moving the sides of the binocular towards or away from each other comprises a shaft 20 extending through a lug 21 on the trackway and having right and left hand screw threaded engagement respectively with a lug 40 on each plate 17. A handle 41 is provided for imparting rotation to the shaft.

The pivotal mounting of the brackets 18 permits each half of the binocular to be inclined to conform to the convergence of the eyes. The halves are movable towards and away from each other in order to provide means for adjusting the same to the interocular distance of various individuals. An inclination of about 5° of each half will usually be required in instruments of the type illustrated. In some optical instruments, perpendicular binoculars may be employed.

Arranged directly beneath the binocular and adapted to reflect the optical beams thereto is a reflecting surface 22 constituted by a pair of mirrors 23, each independently adjustable in order that compensating movements, corresponding to adjusting movements of the binocular, may be carried out.

Each mirror is mounted on a bracket 24 located in the forward corner of the U-frame and having generally triangular mirror-supporting flanges 25 adapted to support the mirror at an inclination in the neighborhood of 45° whereby the optical beam received thereby will be reflected in an upward direction. The mirror is mounted for tilting movement about a horizontal axis on the flanges in order to adjust to a slight extent its degree of inclination. As shown, a pair of lugs 42 on the under surface of the mirror are pivoted at 26 to the lower portion of the flanges and have adjustable movement with the upper portion of the flanges by means of a bolt 27 carried by each flange and passing through a slot 28 in the lug. As will be readily understood, the bolts 27 may be loosened to permit desired tilting movement or tightened to lock the mirror in an adjusted inclined position. An end opening 32 in each exposed flange permits insert of means for loosening or tightening the bolt on the inner flange.

The mirrors are also mounted for a small degree of movement about a vertical axis. To this end, each bracket 24 has a pivotal movement about a pivot 29 on the bottom wall of the U-frame, and carries a bolt 30 which passes through a slot 31 in the bottom wall.

In the opposite corner of the U-frame is mounted a mirror 33 constituting a second reflecting surface. The mirror 33 is carried by a pair of substantially triangular plates 34 secured to the edge of the U-frame whereby its reflecting surface is inclined at an angle of substantially 90° with respect to surface 22 or 45° with respect to the vertical. It thus is adapted to receive downwardly directed optical beams and to deflect them forwardly to surface 22.

Mounted directly above the mirror 33 are a pair of mirrors 35 constituting a third reflecting surface. The mirrors 35 are carried by a pair of inclined wings 36 on the frame portion 14. As shown, the mirrors 35 are oppositely inclined with respect to each other at an angle of substantially 45°, whereby laterally directed optical beams received thereby will be reflected downwardly to mirror 33.

It will be observed that the optical beams from the objects 6 and 7 under consideration will be received by the mirrors 5 and transmitted in lateral and opposite directions to the mirrors 35 which reflect the beams downwardly onto mirror 33. Mirror 33 transmits the beams to mirrors 23, which direct them upwardly into the eye tubes. The offsetting of the lines of sight by the lateral direction of the beams renders unnecessary the provision of separate means for this purpose.

There is thus provided an image-correcting means with which is incorporated a line of sight offsetting means, located externally with respect to the telescope or binocular employed, and consisting of two pairs of reflecting surfaces, one pair of which interchanges the two sides of the image while the other pair serves to revert it.

It will be observed that the arrangement of mirrors is such as to provide convenience in use of the instrument. Thus, the mirrors are compactly arranged and the oppositely inclined mirrors 35 provide therebetween ample space for the head of the operator when applying his eyes to the tubes.

While the invention has been described with particular reference to a map-making device, it will be understood that it may be applied to any optical instrument in which its use is desirable. Moreover, while a two-eye beam directing means has been described it will be apparent that, in instruments where but a single telescope or equivalent structure is employed, a single beam directing means in accordance with the invention as defined may be employed. Furthermore, while the invention has been described in association with a telescope-like lens-carrying tube having an eye-piece and objective, it may be associated with other optical devices wherein, for instance, no eye-piece is employed, or wherein a single eye-piece is employed in conjunction with two objectives.

It will be understood, therefor, that various changes may be made in the structure described without departing from the spirit and scope of the invention as defined in the appended claims.

I claim:

1. In an optical instrument having image-producing means including a light-shielding enclosure and an objective carried thereby, image-inverting means externally of the enclosure comprising a mirror adapted to receive an optical beam extending in an upward direction from an object and to direct it laterally, a second mirror adapted to receive the beam from the first mirror and to direct it oppositely and substantially parallelly to the original upward direction, a third mirror adapted to receive the beam from the second mirror and to direct it at right angles to and in a plane parallel to the laterally directed beam, and a fourth mirror adapted to receive the beam from the third mirror and to direct it substantially parallelly to the original upward direction and into said enclosure.

2. Optical beam directing means for optical instruments consisting of image-producing means including a pair of light-shielding tubes each carrying an objective and means externally of said tubes for correcting and offsetting a pair of images viewed thereby comprising means constituting a first reflecting surface for receiving optical beams from a pair of objects and for reflecting them in opposite lateral directions, means constituting a second reflecting surface for receiving the laterally directed beams and for reflecting them downwardly, means constituting a third reflecting surface for receiving the downwardly directed beams and for reflecting them forwardly, and means constituting a fourth reflecting surface for receiving the forwardly directed beams and for directing them upwardly into said tubes, said last mentioned means comprising a pair of independently movable mirrors.

3. Optical beam directing means for optical instruments consisting of a frame, an image-producing binocular including a pair of light-shielding eye tubes and an objective in each tube, each tube being pivotally mounted in said frame, means for moving said eye tubes towards and away from each other, and means externally of said binocular for correcting a pair of images viewed therethrough comprising a pair of mirrors constituting a first reflecting surface, each mirror being mounted in said frame in opposed relation to a respective eye tube, means for adjusting the position of each mirror in said frame to compensate for movements of its respective eye tube, a single mirror fixed to said frame and constituting a second reflecting surface, and a pair of mirrors fixed to said frame in inclined relation to each other and constituting a third reflecting surface.

4. In an optical instrument having image-producing means including a light-shielding enclosure and an objective carried thereby, a frame having means for adjustably mounting said enclosure therein, and image-inverting means carried by the frame and located externally of said enclosure, said image-inverting means comprising a pair of mirrors having opposed and oppositely inclined reflecting surfaces adapted to transmit optical beams into said enclosure, and a second pair of mirrors having opposed and oppositely inclined reflecting surfaces adapted to transmit optical beams from an object to said first surfaces, at least one of each pair of mirrors being adjustable as to position in the frame.

5. In an optical instrument having image-producing means including a light-shielding enclosure for each eye and an objective carried thereby, a frame having means for adjustably mounting each enclosure therein, and image-inverting means carried by the frame and located externally of the enclosures, said image-inverting means comprising a pair of mirrors having opposed and oppositely inclined reflecting surfaces adapted to transmit optical beams into said enclosures, one of said mirrors consisting of two parts, one opposite each enclosure, each part having independent means for adjusting its position in the frame, the other of said mirrors being fixed in the frame, and a second pair of mirrors having opposed and oppositely inclined reflecting surfaces adapted to transmit optical beams from an object to said first surfaces, one of said second pair of mirrors being fixed in the frame, and the other of said second pair of mirrors being adjustable as to position in the frame.

6. An optical instrument as defined in claim 5 wherein the means for adjusting the position of each part of said two-part mirror comprises a bracket carrying said part, said bracket being mounted for limited rotative movement relative to the frame, and means on the bracket for varying the angle of inclination of the mirror reflecting surface on the part carried thereby.

HAROLD EMERY SEELY.